(12) United States Patent
Shim et al.

(10) Patent No.: US 9,323,977 B2
(45) Date of Patent: Apr. 26, 2016

(54) APPARATUS AND METHOD FOR PROCESSING 3D INFORMATION

(71) Applicant: SAMSUNG ELECTRONICS CO., LTD., Suwon-si (KR)

(72) Inventors: Hyun Jung Shim, Seoul (KR); Seung Kyu Lee, Seoul (KR); Do Kyoon Kim, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 210 days.

(21) Appl. No.: 13/891,359

(22) Filed: May 10, 2013

(65) Prior Publication Data

US 2013/0301907 A1 Nov. 14, 2013

Related U.S. Application Data

(60) Provisional application No. 61/645,239, filed on May 10, 2012.

(30) Foreign Application Priority Data

Oct. 30, 2012 (KR) .................. 10-2012-0120948

(51) Int. Cl.
*G06K 9/00* (2006.01)
*G01B 11/02* (2006.01)
(Continued)

(52) U.S. Cl.
CPC ............ *G06K 9/00201* (2013.01); *G01B 11/02* (2013.01); *G01B 11/22* (2013.01); *G06T 7/0065* (2013.01); *G06T 2207/10028* (2013.01)

(58) Field of Classification Search
CPC .... G06K 9/00201; G01B 11/02; G01B 11/22; G06T 2207/10028; G06T 7/0065

USPC .......................................................... 382/154
See application file for complete search history.

(56) References Cited

U.S. PATENT DOCUMENTS 6,002,357 A * 12/1999 Redfern et al. .................. 342/22
7,548,324 B2 * 6/2009 Lee et al. ....................... 356/605
(Continued)

FOREIGN PATENT DOCUMENTS

CN 101 951 527 A 1/2011
CN 102 165 496 A 8/2011
(Continued)

OTHER PUBLICATIONS

International Search Report mailed May 8, 2013 in corresponding International Application No. PCT/KR2013/004010.
(Continued)

*Primary Examiner* — Gregory F Cunningham
(74) *Attorney, Agent, or Firm* — Harness, Dickey & Pierce, P.L.C.

(57) ABSTRACT

An apparatus and method for processing three-dimensional (3D) information is described. The 3D information processing apparatus may measure first depth information of an object using a sensor apparatus such as a depth camera, may estimate a foreground depth of the object, a background depth of a background, and a degree of transparency of the object, may estimate second depth information of the object based on the estimated foreground depth, background depth, and degree of transparency, and may determine the foreground depth, the background depth, and the degree of transparency through comparison between the measured first depth information and the estimated second depth information.

20 Claims, 7 Drawing Sheets

(51) Int. Cl.
*G01B 11/22* (2006.01)
*G06T 7/00* (2006.01)

(56) References Cited

U.S. PATENT DOCUMENTS

| | | | |
|---|---|---|---|
| 8,218,061 B2* | 7/2012 | Baxansky | 348/345 |
| 8,345,751 B2* | 1/2013 | Klein Gunnewiek et al. | 375/240.08 |
| 2008/0150965 A1 | 6/2008 | Bischoff et al. | |
| 2008/0175576 A1* | 7/2008 | Hong et al. | 396/89 |
| 2008/0309913 A1* | 12/2008 | Fallon | 356/4.01 |
| 2011/0007131 A1 | 1/2011 | Okada et al. | |
| 2011/0081042 A1 | 4/2011 | Kim et al. | |
| 2011/0181588 A1 | 7/2011 | Barenbrug et al. | |
| 2012/0280996 A1* | 11/2012 | Kannan et al. | 345/426 |
| 2014/0168424 A1* | 6/2014 | Attar et al. | 348/140 |

FOREIGN PATENT DOCUMENTS

| | | |
|---|---|---|
| EP | 0 660 075 A2 | 6/1995 |
| GB | 2 206 429 A | 1/1989 |
| GB | 2 359 230 A | 8/2001 |
| KR | 10-0790892 | 12/2007 |
| KR | 10-2011-0116325 | 10/2011 |
| KR | 10-2012-0018915 | 3/2012 |
| KR | 10-2012-0040924 | 4/2012 |
| WO | WO-98/47097 A1 | 10/1998 |

OTHER PUBLICATIONS

European Search Report mailed on Dec. 17, 2015, for corresponding EP Application No. 13787383.2.
Chinese Office Action corresponding to Chinese Application No. 201380024447.6 and English translation thereof mailed on Jan. 19, 2016.

* cited by examiner

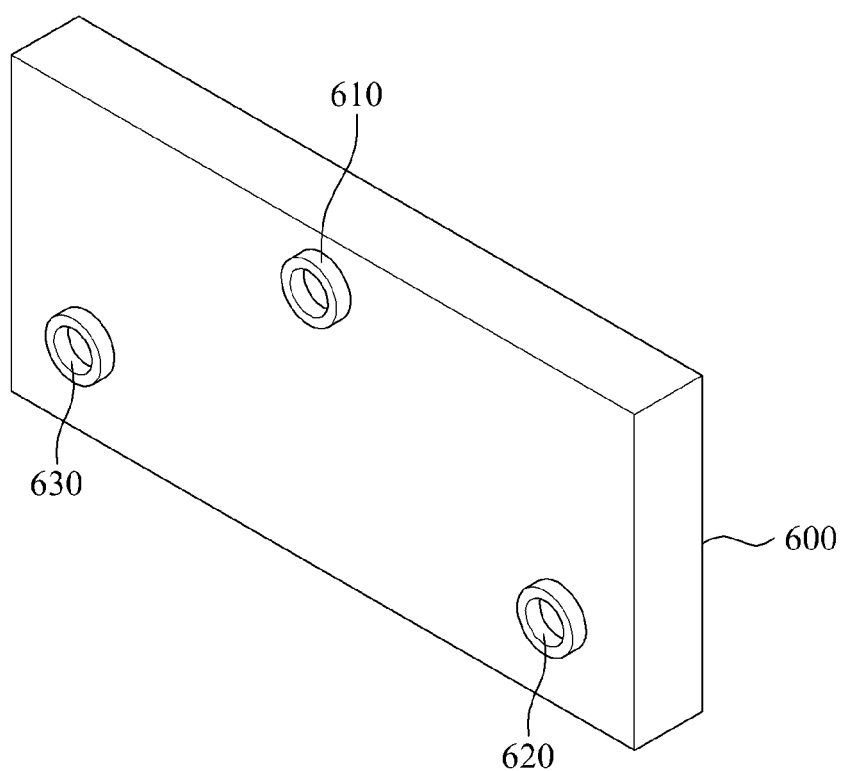

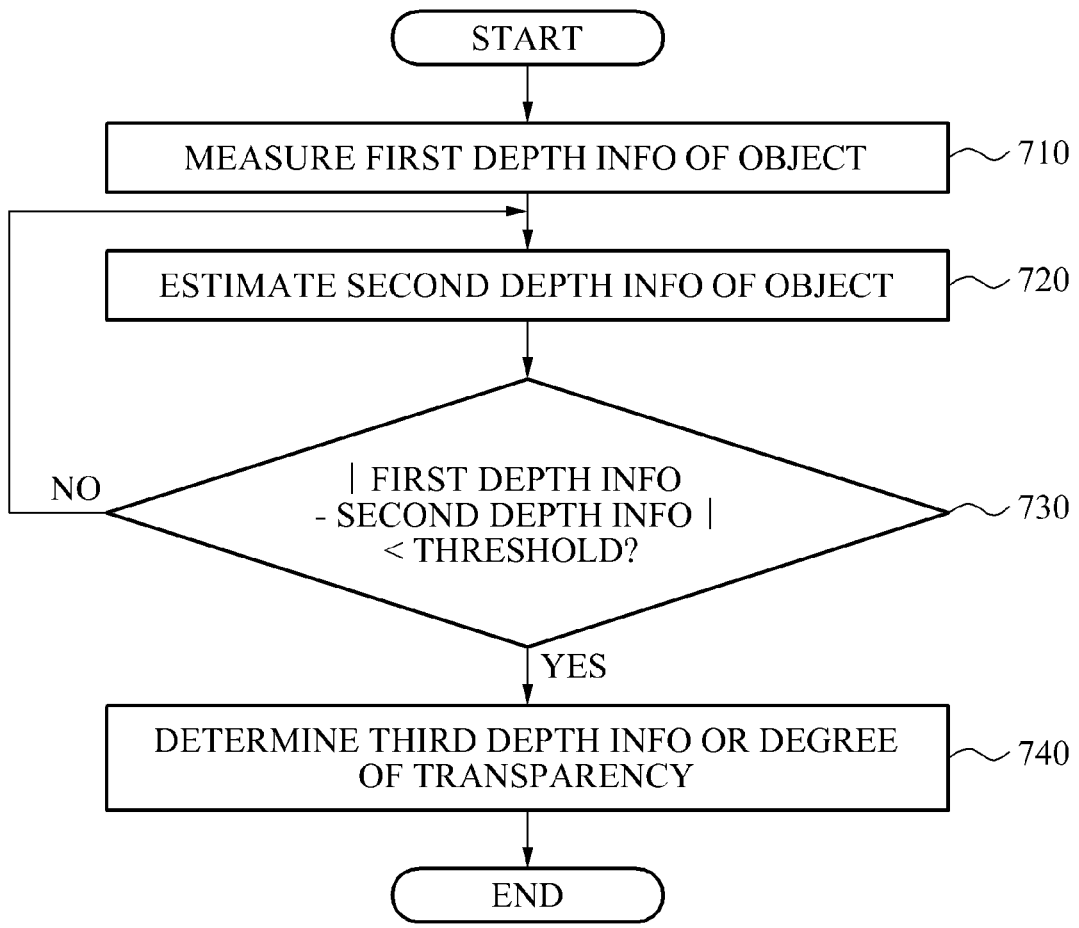

APPARATUS AND METHOD FOR PROCESSING 3D INFORMATION

CROSS-REFERENCE TO RELATED APPLICATIONS

This application claims the priority benefit of U.S. Provisional Patent Application No. 61/645,239, filed on May 10, 2012, in the Unites States Patent and Trademark Office, and Korean Patent Application No. 10-2012-0120948, filed on Oct. 30, 2012, in the Korean Intellectual Property Office, the disclosures of which are incorporated herein by reference.

BACKGROUND

1. Field

One or more embodiments of the following description relate to an apparatus and method for processing three-dimensional (3D) information, and more particularly, to technology of obtaining depth information of an object.

2. Description of the Related Art

Three-dimensional (3D) information processing technology refers to technology for processing an object that enables a user to experience a 3D effect. 3D object capturing technology refers to a type of 3D information processing technology, and may generate data by obtaining shape information of various types of objects having a 3D shape, position information, and texture information and may process the generated data. Digital data generated using the 3D object capturing technology may be utilized as content for 3D television and the like.

Depth information refers to information associated with a distance between a predetermined position, for example, a position of a depth camera and an object, and may be calculated based on, for example, a position of the object. Depth information of an object may be used as reference to verify a 3D-shape of the object. Accordingly, in the 3D object capturing technology, it is very important to obtain accurate depth information of the object.

To obtain depth information of an object, a 3D object capturing apparatus may transmit an infrared (IR) pulse and may determine a position of the object using a signal that occurs when the IR pulse is reflected from the object and thereby is returned. Conventional 3D object capturing apparatuses, however, generally experience difficulty in accurately measuring a depth of transparent objects.

SUMMARY

The foregoing and/or other aspects are achieved by providing an apparatus for processing three-dimensional (3D) information, the apparatus including a measuring unit to measure first depth information of an object, an estimating unit to estimate second depth information of the object, a comparing unit to compare the measured first depth information and the estimated second depth information, and a determining unit to determine third depth information of the object based on the comparison result.

The estimating unit may estimate a foreground depth of the object, a background depth of a background, and a degree of transparency of the object, and may estimate the second depth information through predetermined modeling, based on the estimated foreground depth, background depth, and degree of transparency.

The estimating unit may estimate the second depth information, based on foreground depth information calculated using a first reflected signal that is reflected from the object at the estimated foreground depth, background depth information calculated using a second reflected signal that passes through the object and is reflected from the background at the estimated background depth, and the estimated degree of transparency of the object.

The estimating unit may estimate the second depth information, based on at least one of foreground depth information calculated using a first reflected signal that is reflected from the object at the estimated foreground depth, intensity of the object, background depth information calculated using a second reflected signal that passes through the object and is reflected from the background at the estimated background depth, intensity of the background, and the estimated degree of transparency of the object.

The modeling may estimate the second depth information according to the following Equation 1:

$$\hat{z} = g^{-1}\left(\frac{(1-t)\cdot L_f \cdot g(z_f)}{z_f^2} + \frac{t\cdot L_b \cdot g(z_b)}{z_b^2} + \sum_{i=0}^{\infty} \frac{t^{i+1}\cdot(1-t)^i \cdot L_b \cdot g(z_b)\cdot g(z_b - z_f)}{z_b^{i+1}\cdot(z_b - z_f)^i}\right)$$ [Equation 1]

In Equation 1, $\hat{z}$ denotes the estimated second depth information, $g(x)$ denotes a function that is determined based on a characteristic of a depth camera for measuring the first depth information, x denotes strength of a received signal, t denotes the estimated degree of transparency of the object, $L_b$ denotes intensity of the background at the estimated background depth, $L_f$ denotes intensity of the object, $z_f$ denotes foreground depth information calculated using a first reflected signal that is reflected from the object at the estimated foreground depth, and $z_b$ denotes background depth information that is calculated using a second reflected signal that passes through the object and is reflected from the background at the estimated background depth.

When a difference between the measured first depth information and the estimated second depth information is within a predetermined range, the determining unit may determine that the third depth information of the object is the estimated second depth information.

When a difference between the measured first depth information and the estimated second depth information is outside a predetermined range, the estimating unit may re-estimate the second depth information by changing the estimated foreground depth and background depth, and the comparing unit may compare the first depth information and the re-estimated second depth information.

The measuring unit may include N depth cameras for receiving a signal reflected from the object, and may generate N items of first depth information corresponding to the N depth cameras, N being an integer greater than or equal to "1". The estimating unit may estimate N items of second depth information corresponding to the N depth cameras based on the estimated foreground depth, background depth, and degree of transparency. The comparing unit may compare the N items of first depth information and the N items of second depth information, respectively.

The measuring unit may include a transmitting unit to transmit an infrared (IR) ray toward the object. The measuring unit may measure the first depth information of the object using a signal that is reflected from the object and a signal that passes through the object and is reflected from a background by the IR ray.

The foregoing and/or other aspects are achieved by providing an apparatus for processing 3D information, the apparatus including a measuring unit to measure first depth information of an object, an estimating unit to estimate a position and a degree of transparency of the object, and to estimate second depth information of the object based on the estimated position and degree of transparency, a comparing unit to compare the measured first depth information and the estimated second depth information, and a determining unit to determine the degree of transparency of the object based on the comparison result.

The estimating unit may estimate the second depth information based on foreground depth information calculated using a first reflected signal that is reflected from the object at the estimated position, background depth information calculated using a second reflected signal that passes through the object and is reflected from a background, and the estimated degree of transparency of the object.

When a difference between the first depth information and the second depth information is outside a predetermined range, the estimating unit may re-estimate the second depth information by changing the estimated position and the comparing unit may compare the first depth information and the re-estimated second depth information.

The foregoing and/or other aspects are achieved by providing a method of processing 3D information, the method including measuring first depth information of an object using a depth camera, and determining third depth information of the object through comparison between the measured first depth information and second depth information.

A foreground depth of the object, a background depth of a background, and a degree of transparency of the object may be estimated, and the second depth information may be estimated through predetermined modeling based on the estimated foreground depth, background depth, and degree of transparency.

The second depth information may be estimated based on foreground depth information calculated using a first reflected signal that is reflected from the object at the estimated foreground depth, background depth information calculated using a second reflected signal that passes through the object and is reflected from the background at the estimated background depth, and the estimated degree of transparency of the object.

The second depth information may be estimated based on at least one of foreground depth information calculated using a first reflected signal that is reflected from the object at the estimated foreground depth, intensity of the object, background depth information calculated using a second reflected signal that passes through the object and is reflected from the background at the estimated background depth, intensity of the background, and the estimated degree of transparency of the object.

The modeling may estimate the second depth information according to Equation 1.

A position of the object may be estimated and the second depth information may be estimated through predetermined modeling based on the estimated position.

The determining may include determining that the third depth information of the object is the estimated second depth information when a difference between the measured first depth information and the estimated second depth information is within a predetermined range.

The foregoing and/or other aspects are achieved by providing a method of processing 3D information, the method including measuring first depth information of an object using a depth camera, and determining a degree of transparency of the object through comparison between the measured first depth information and second depth information.

A foreground depth of the object, a background depth, and the degree of transparency of the object may be estimated, and the second depth information may be estimated through predetermined modeling based on the estimated foreground depth, background depth, and degree of transparency.

The second depth information may be estimated based on foreground depth information calculated using a first reflected signal that is reflected from the object at the estimated foreground depth, background depth information calculated using a second reflected signal that passes through the object and is reflected from the background at the estimated background depth, and the estimated degree of transparency of the object.

The foregoing and/or other aspects are achieved by providing a 3D information processing method for estimating depth information of an object based on foreground depth information calculated by estimating a foreground depth of the object, and using a first reflected signal that is reflected from the object at the estimated foreground depth, background depth information calculated by estimating a background depth and using a second reflected signal that passes through the object and is reflected from the background at the estimated background depth, and a degree of transparency of the object.

The foregoing and/or other aspects are achieved by providing a method of determining whether an object is transparent. The method includes capturing a depth value of the object using a plurality of different depth cameras, comparing, by way of a processor, the depth values of the object captured using the plurality of different depth cameras, and determining a degree of transparency of the object by comparing the measured first depth information and second depth information.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 6 illustrates an example of a 3D information processing apparatus including a plurality of depth cameras; and FIG. 7 illustrates a method of processing 3D information according to an embodiment.

DETAILED DESCRIPTION

Figure 1:
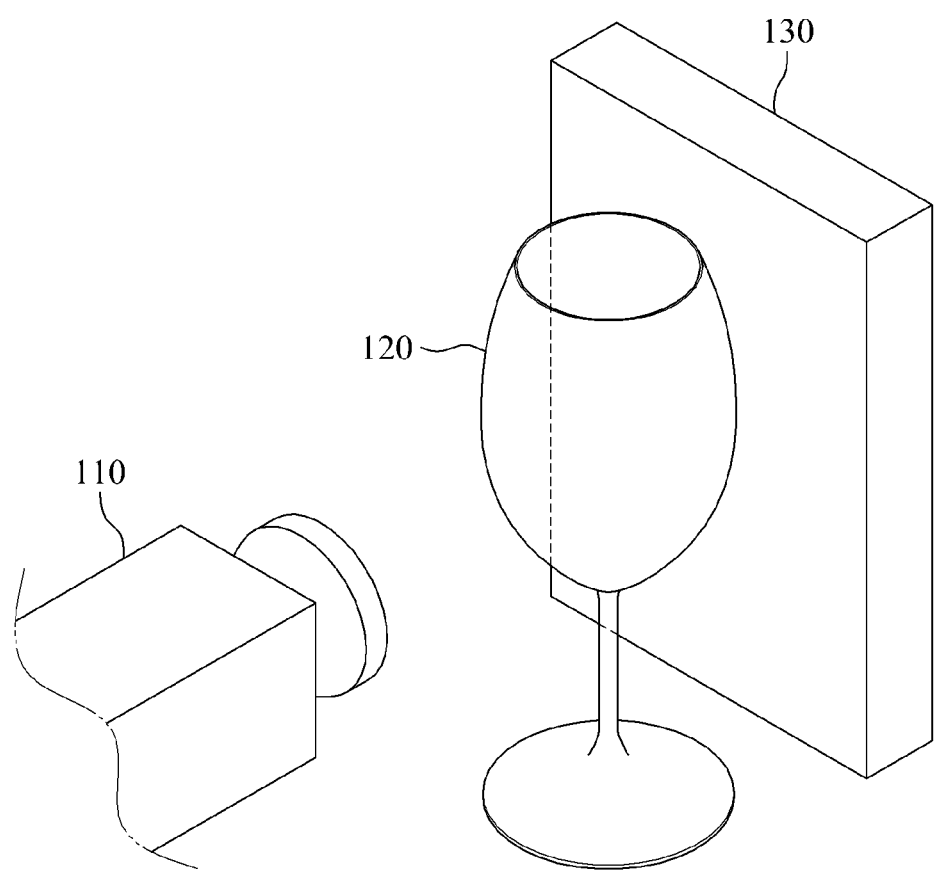
FIG. 1 illustrates a diagram to describe three-dimensional (3D) information processing technology according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a diagram to describe three-dimensional (3D) information processing technology according to an embodiment.

A 3D information processing apparatus 110 refers to an apparatus to process information associated with an object 120 having a 3D shape. For example, the 3D information processing apparatus 110 may include an apparatus to obtain depth information of the object 120. Also, the 3D information processing apparatus 110 may include a 3D object capturing apparatus to obtain information associated with a position, a shape, and a texture of the object 120. Information associated with a position, a shape, and a texture of the object 120 may be displayed for a user using a 3D display apparatus so that the user may feel a 3D effect.

The 3D information processing apparatus 110 may obtain depth information of the object 120 using a depth camera. The depth camera refers to a camera capable of measuring depth information by measuring a depth of the object 120 that is a photographing target. The term "depth camera" as used here may include any apparatus capable of measuring depth information, such as a depth camera using a time of flight (TOF) scheme, a depth camera using a structured light scheme, and a depth camera based on normal acquisition, for example. The 3D information processing apparatus 110 may obtain information associated with a position, a shape, and a texture of the object 120 by photographing the object 120 using a camera and analyzing a captured image.

A background 130 may be positioned behind the object 120 to be photographed by the depth camera. In this example, information obtained using the depth camera may include information associated with the object 120 and information associated with the background 130.

In particular, when the object 120 has a light transmitting property, e.g., when the object 120 is transparent or translucent, information obtained using the depth camera may include information associated with the background 130. For example, when the object 120 is transparent or translucent, information associated with the background 130 may be included in an image portion captured from the object 120, among images captured using the depth camera. When the object 120 is transparent, the depth camera may receive a signal that passes through the object 120 and is reflected from the background 130 without attenuation. When the object 120 is translucent, the depth camera may receive a signal that is reflected from the background 130 and is attenuated by the object 120.

Accordingly, when the object 120 has a light transmitting property, depth information of the object 120 obtained by analyzing information that is obtained using the depth camera may be inaccurate.

According to to one more embodiments of the present disclosure, the 3D information processing apparatus 110 may estimate depth information of the object 120, depth information of the background 130, and a degree of transparency of the object 120, and may estimate depth information of the object 120 based on a mathematical model. The 3D information processing apparatus 110 may determine depth information of the object 120, depth information of the background 130, and/or the degree of transparency of the object 120 through comparison between the measured depth information and the estimated depth information of the object 120.

According to one more embodiments of the present disclosure, even though the object 120 has a light transmitting property, depth information of the object 120 may be generated more accurately using the depth camera. Even though information obtained from the object 120 and the background 130 may be mixed in a depth image captured using the depth camera, depth information of the object 120 may be accurately determined. Also, even though information associated with the background 130 is included in a portion captured from the object 120 in a depth image due to a transparent or translucent property of the object 120, depth information of the object 120 may be accurately determined. Accordingly, a predetermined scene may be synthesized based on a variety of view conditions and light conditions. A virtual object may be mixed and synthesized by rendering the virtual object to be suitable for a real image.

Figure 2:
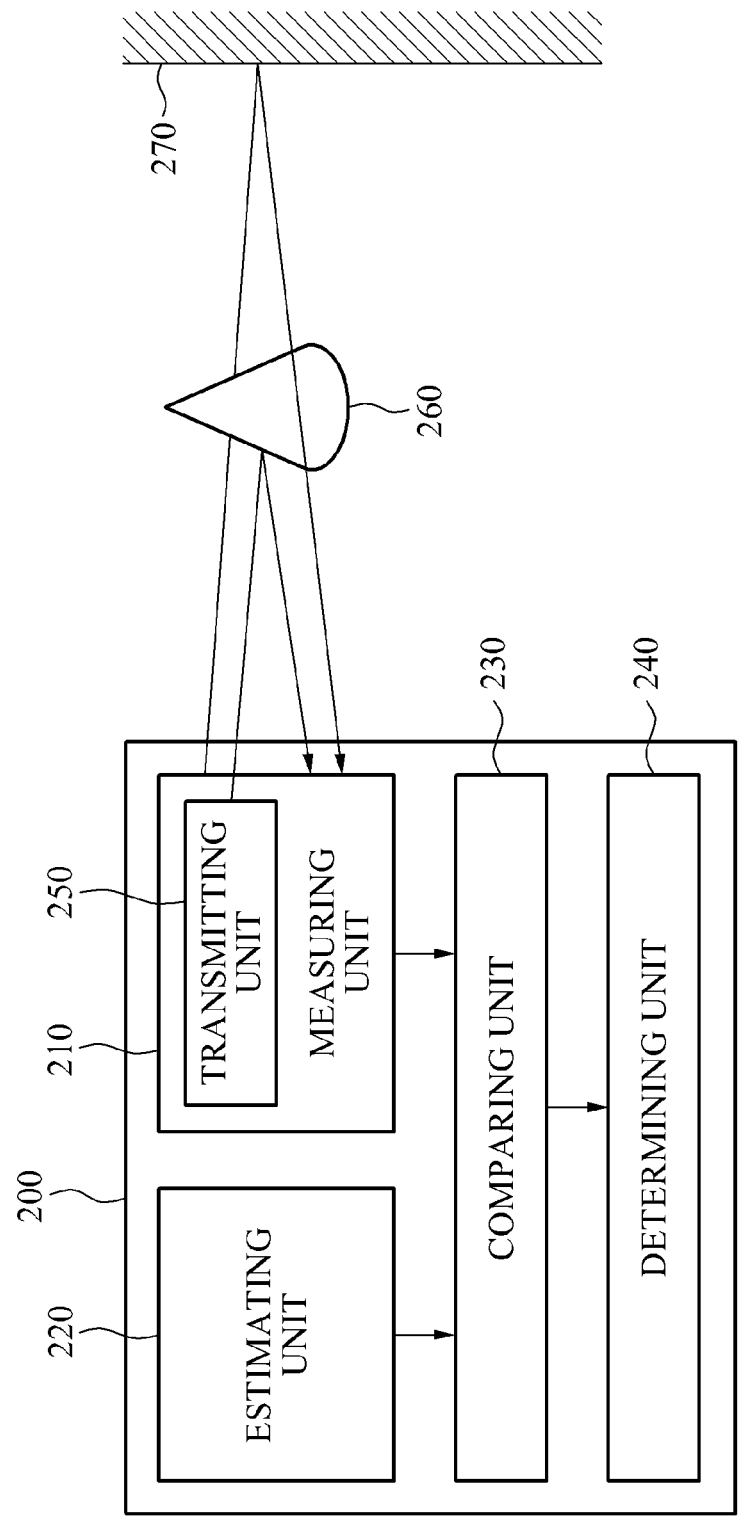
FIG. 2 illustrates a 3D information processing apparatus according to an embodiment.

FIG. 2 illustrates a 3D information processing apparatus 200 according to an embodiment.

Referring to FIG. 2, the 3D information processing apparatus 200 may include, for example, a measuring unit 210, an estimating unit 220, a comparing unit 230, and a determining unit 240.

The measuring unit 210 may measure first depth information of an object 260. The first depth information may be a measured value of the object 260, for example, a depth value or other predetermined value of the object 260.

The measuring unit 210 may include a depth camera. A depth image captured using the depth camera may include a plurality of pixels. A value of each of the plurality of pixels may be determined based on a value of a signal received by the depth camera.

The measuring unit 210 may measure first depth information by analyzing a depth image captured using the depth camera. The depth camera may be, for example, a depth camera using a conventional TOF scheme.

The 3D information processing apparatus 200 may further include a transmitting unit 250 to transmit a pulse toward the object 260. For example, the measuring unit 210 of the 3D information processing apparatus 200 may include the transmitting unit 250 to transmit a pulse toward the object 260. Here, the pulse transmitted by the transmitting unit 250 may be an infrared (IR) ray. The measuring unit 210 may measure first depth information of the first object 260 using a signal that is reflected from the object 260 when the object 260 is irradiated by the IR ray. When the object 120 has a light transmitting property, the measuring unit 210 may measure first depth information of the object 260 using a signal that is reflected from the object 260 and a signal that passes through the object 260 and is reflected from a background 270 when the background is irradiated by the IR ray.

The measuring unit 210 may determine a value of a signal received by the depth camera by analyzing a pixel value of a depth image, and may measure first depth information of the object 260 using the value of the received signal.

The estimating unit 220 may estimate second depth information of the object 260. The second depth information may be an estimated value of the object 260, for example, an estimated depth value or a predetermined estimated value of the object 260. The estimating unit 220 may estimate second depth information through predetermined modeling in response to a user request. Here, the second depth information may be estimated in real time. The estimating unit 220 may estimate second depth information by storing at least one of pre-estimated second depth information of the object 260. Here, at least one of the pre-estimated second depth information may be pre-calculated and be stored in a storing unit (not shown) of the 3D information processing unit 200.

The estimating unit 220 may estimate a position and a degree of transparency of the object 260, and may estimate second depth information of the object 260 based on the estimated position and degree of transparency. That is in an embodiment, the estimating unit 220 may estimate a position of the object by estimating an approximate space where the object is located, such as locating a center position of the object. The estimating unit 220 may estimate second depth information based on foreground depth information, background depth information, and the estimated degree of transparency of the object 260. The foreground depth information may be calculated using a first reflected signal that is reflected from the object 260 at the estimated position of the object 260. The background depth information may be calculated using a second reflected signal that passes through the object 260 and is reflected from the background 270. The estimating unit 220 may estimate second depth information according to Equation 2 or Equation 3.

The estimating unit 220 may estimate a foreground depth of the object 260, a background depth of the background 270, and a degree of transparency of the object 260, and may estimate the second depth information through predetermined modeling, based on the estimated foreground depth, background depth, and degree of transparency.

The foreground depth may indicate a distance from a predetermined position, for example, a position of the 3D information processing apparatus 200, a position of the measuring unit 210, a position of the transmitting unit 250, and a position of the depth camera, to the object 260.

The background depth may indicate a distance from a predetermined position, for example, a position of the 3D information processing apparatus 200, a position of the measuring unit 210, a position of the transmitting unit 250, and a position of the depth camera, to the background 270.

The estimating unit 220 may estimate second depth information based on at least one of foreground depth information, background depth information, and the estimated degree of transparency of the object 260. For example, the estimating unit 220 may estimate second depth information based on all of foreground depth information, background depth information, and the estimated degree of transparency of the object 260.

The foreground depth information may be a value associated with the object 260. For example, the foreground depth information may be calculated using a first reflected signal that is reflected from the object 260 at the estimated foreground depth. Based on the assumption that the object 260 is positioned at the estimated foreground depth, the estimated foreground depth may be calculated through predetermined modeling.

The background depth information may be a value associated with the object 260 and the background 270. For example, the background depth information may be calculated using a second reflected signal that passes through the object 260 and is reflected from the background 270 at the estimated background depth. Based on the assumption that the object 260 or the background 270 is positioned at the estimated background depth, the estimated background depth may be calculated through predetermined modeling.

The estimated degree of transparency may be a value associated with the object 260, and may use a value greater than or equal to "0" and less than or equal to "1".

Modeling may be a function of using a value associated with the object 260 as an input and using the estimated second depth information of the object 260 as an output. For example, modeling may be a function of using at least one or all of the calculated foreground depth information, the background depth information, and the degree of transparency of the object 260 as an input, and using the estimated second depth information of the object 260 as an output.

The comparing unit 230 may compare the measured first depth information and the estimated second depth information. The comparing unit 230 may determine whether a difference between the measured first depth information and the estimated second depth information is within a predetermined range.

The determining unit 240 may determine third depth information of the object 260, based on the comparison result. For example, when the measured first depth information and the estimated depth information is identical, or when the difference between the measured first depth information and the estimated second depth information is within the predetermined range, the determining unit 240 may determine third depth information of the object 260, for example, actual depth information of the object 260, to be the estimated second depth information. Alternatively, in an embodiment, the determining unit 240 may determine the third depth information of the object 260 to be the estimated foreground information of the object 260.

On the contrary, when the difference between the measured first depth information and the estimated second depth information is outside the predetermined range, the estimating unit 220 may re-estimate the second depth information by changing the estimated foreground depth and/or the background depth. Here, the comparing unit 230 may compare the first depth information and the re-estimated second depth information. When the first depth information and the re-estimated second depth information is identical or when a difference between the measured first depth information and the re-estimated second depth information is within a predetermined range, the determining unit 240 may determine the third depth information of the object 260, for example, actual depth information of the object, to be the estimated second depth information. Alternatively, in an embodiment, the determining unit 240 may determine the third depth information of the object 260, for example, actual depth information of the object 260, to be re-estimated foreground information of the object 260.

When the difference between the measured first depth information and the re-estimated second depth information is still outside the predetermined range, the estimating unit 220 may yet again re-estimate the second depth information by again changing the estimated foreground depth and background depth. The comparing unit 230 may in this way repeat a process of comparing the first depth information and the re-estimated second depth information.

The determining unit 240 may determine that the object 260 is positioned on a predetermined straight line corresponding to the depth camera, and that a distance from the depth camera is determined based on third depth information.

The determining unit 240 may determine a degree of transparency of the object 260 based on the comparison result. For example, when the measured first depth information and the estimated depth information is identical, or when the difference between the measured first depth information and the estimated second depth information is within the predetermined range, the determining unit 240 may determine that the estimated degree of transparency of the object 260 is the degree of transparency of the object 260.

When the difference between the measured first depth information and the estimated second depth information is outside the predetermined range, the estimating unit 220 may re-estimate the degree of transparency as another value and may re-estimate the second depth information of the object based on the re-estimated degree of transparency. The comparing unit 230 may compare the first depth information and the re-estimated second depth information. When the first depth information and the re-estimated second depth information is identical, or when the difference between the measured first depth information and the re-estimated second depth information is within the predetermined range, the determining unit 240 may determine that the degree of transparency of the object 260 is the estimated degree of transparency of the object 260.

When the difference between the measured first depth information and the re-estimated second depth information is still outside the predetermined range, the estimating unit 220 may again re-estimate the second depth information by again changing the estimated foreground depth and background depth. The comparing unit 230 may in this way repeat a process of comparing the first depth information and the re-estimated second depth information.

Figure 3:
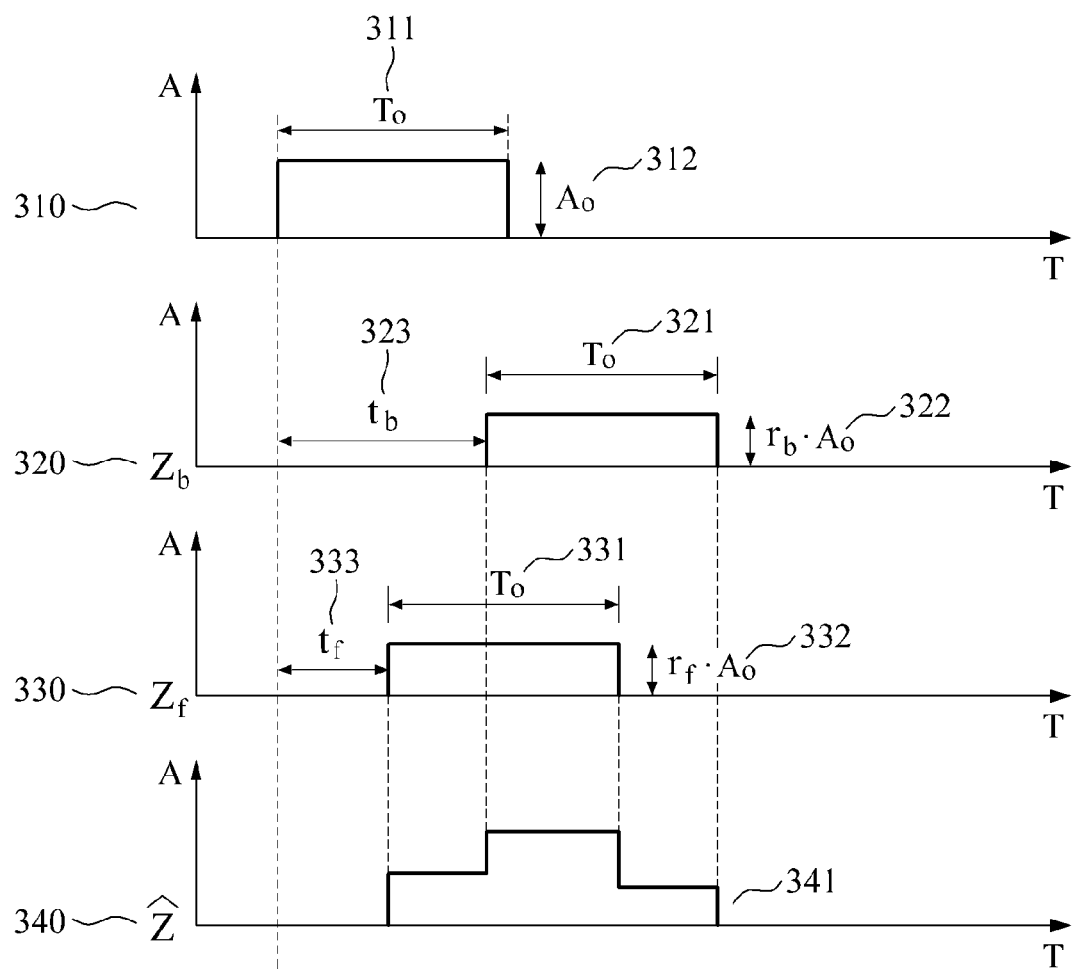
FIG. 3 illustrates graphs to describe a method of estimating background depth information, foreground depth information, and second depth information of an object according to an embodiment.

FIG. 3 illustrates graphs to describe a method of estimating background depth information, foreground depth information, and second depth information of an object according to an embodiment. Here, a horizontal axis denotes a time and a vertical axis denotes amplitude of a pulse.

Referring to FIG. 3, a pulse 310 transmitted from a transmitting unit may be an IR ray. Depending on embodiments, the pulse 310 may be any of a visible ray, a high frequency, and a low frequency. The pulse 310 transmitted from the transmitting unit may have a length of $T_0$ 311 and amplitude $A_0$ 312. The transmitting unit may be a depth camera, for example, a TOF camera.

To estimate second depth information of an object, the object may be assumed to be positioned at a foreground depth. The foreground depth may indicate a distance from a predetermined position to the object. For example, the foreground depth may indicate a predetermined position, such as a position of a 3D information processing apparatus, a position of a measuring unit, a position of the transmitting unit, and a position of the depth camera, for example, to the object.

Also, a background may be assumed to be positioned at a background depth. The background depth may indicate a distance from a predetermined position to the background. For example, the background depth may indicate a distance from a predetermined position, such as a position of the 3D information processing apparatus, a position of the measuring unit, a position of the transmitting unit, and a position of the depth camera, for example, to the background.

A degree of transparency of the object may be estimated. The estimated degree of transparency may be a value associated with the object, and may use a value greater than or equal to "0" and less than or equal to "1".

Background depth information 320 may be calculated using a second reflected signal that is reflected from the background when pulse 310 strikes or irradiates the background. The background depth information 320 may be a value associated with the object and may be calculated using the second reflected signal that passes through the object and is reflected from the background at the estimated background depth when pulse 310 strikes the background. For example, based on the assumption that the object is positioned at the estimated background depth, the estimated background depth information 320 may be calculated through predetermined modeling.

For example, a signal reflected from the background may be estimated by the pulse 310. The signal reflected from the background when pulse 310 strikes the background may proceed from the depth camera to the background and from the background to the depth camera. Accordingly, time may be delayed by $t_b$ 323 of FIG. 3. Also, while passing through the object, an amplitude may be decreased to $r_b$, $A_0$ 322. Here, b denotes a constant that is determined based on the estimated degree of transparency of the object, and may be greater than or equal to "0" and less than or equal to "1". According to an increase in the estimated degree of transparency of the object, a value of $r_b$ may increase. Also, a length of the signal reflected from the background is $T_0$ 321.

Foreground depth information 330 may be calculated using a first reflected signal that is reflected from the object when pulse 310 strikes the object. The foreground depth information 330 may be a value associated with the object and may be calculated using the first reflected signal that is reflected from the object at the assumed foreground depth. For example, based on the assumption that the object is positioned at the estimated foreground depth, the estimated foreground depth information 330 may be calculated through predetermined modeling.

For example, a signal reflected from the object may be estimated by when pulse 310 strikes the object. The signal reflected from the object may proceed from the depth camera to the object and from the object to the depth camera. Accordingly, time may be delayed by $t_f$ 333 of FIG. 3. Also, amplitude may be decreased to $r_f A_0$ 332. Here, $r_f$ denotes a constant, and may be greater than or equal to "0" and less than or equal to "1". Also, a length of the signal reflected from the object is $T_0$ 331.

Second depth information 340 may be estimated based on foreground depth information, background depth information, and the estimated degree of transparency of the object.

A signal 341 estimated to be received by the depth camera may be expressed as a combination or summation of the second reflected signal that is reflected from the background and the first reflected signal that is reflected from the object. The signal 341 may include a signal that is repeatedly reflected between the background and the object. When the signal 341 is calculated, the second depth information 340 may be estimated based on the signal 341.

Figure 4:
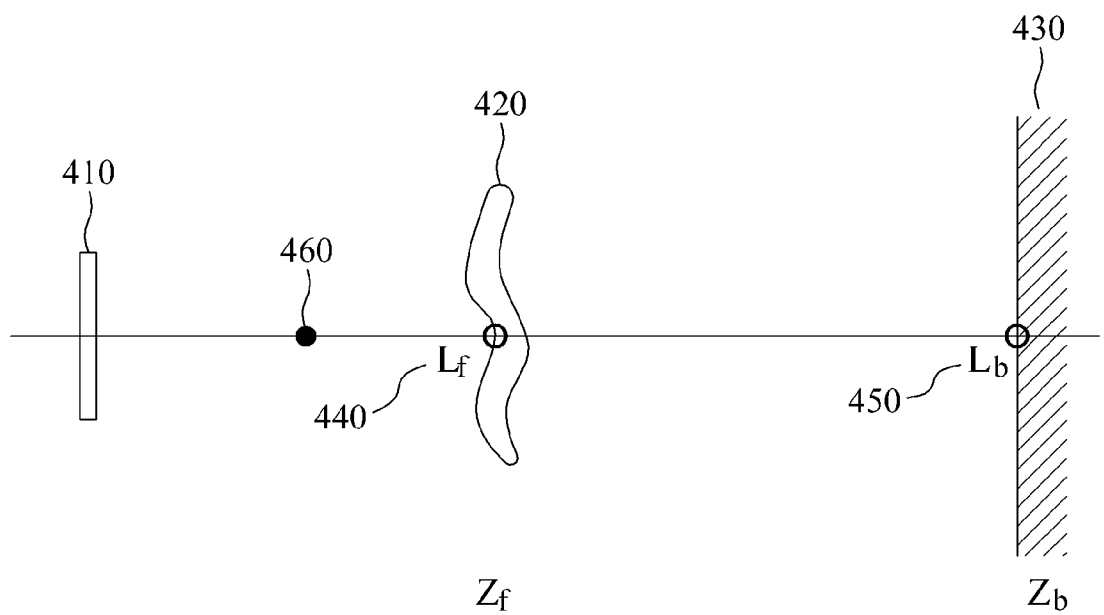
FIG. 4 illustrates a diagram to describe an operation of determining depth information of an object according to an embodiment.

FIG. 4 illustrates a diagram to describe an operation of determining depth information of an object according to an embodiment.

Referring to FIG. 4, a background 430 may be positioned behind an object 420. Information associated with the background 430 may be included in an image captured from the object 420 using a depth camera 410. In particular, when the object 420 transmits at least a portion of light, for example, when the object 420 is transparent or translucent, pixels captured from the object 420 may include a signal reflected from the object 420 and a signal reflected from the background 430.

Accordingly, second depth information estimated by analyzing a signal received using the depth camera 410 may be a value that is determined based on an estimated foreground depth of the object 420, an estimated background depth of the background 430, and an estimated degree of transparency of the object 420, as given by Equation 2.

$$\hat{z} = f(z_f, z_b, t) \qquad \text{[Equation 2]}$$

In Equation 2, $\hat{z}$ denotes estimated second depth information, and $z_f$ denotes foreground depth information and thus, may be calculated using a signal that is reflected from the object 420 at the estimated foreground depth of the object 420. Also, $z_b$ denotes background depth information and thus, may be calculated using a signal that is reflected from the object 430.

t denotes the estimated degree of transparency of the object 420. When a value of t is "0", the object 420 may be an opaque object. When a value of t is "1", the object 420 may be a completely transparent object. t may be a value greater than or equal to "0" and less than or equal to "1". Here, f(x) denotes a function and x denotes strength of the received signal.

By distinguishing the signal reflected from the object 420 and the signal reflected from the background 430, Equation 2 may be expressed by Equation 3.

$$\hat{z} = g^{-1}\left(\frac{(1-t) \cdot L_f \cdot g(z_f)}{z_f^2} + \frac{t \cdot L_b \cdot g(z_b)}{z_b^2} + \sum_{i=0}^{\infty} \frac{t^{i+1} \cdot (1-t)^i \cdot L_b \cdot g(z_b) \cdot g(z_b - z_f)}{z_b^{i+1} \cdot (z_b - z_f)^i}\right)$$ [Equation 3]

In Equation 3, $g^{-1}(x)$ denotes an inverse function of g(x). g(x) may be a function that is determined based on a characteristic of the depth camera 410. $L_f$ 440 denotes intensity of the object 420, and $L_b$ 450 denotes intensity of the background 430.

In Equation 3, a parameter input to $g^{-1}(x)$ may include a summation of three components. A first component may represent strength of a signal reflected from the object 420. The first component is in inverse proportion to a square of $z_f$ of the object 420 and is in proportion to $L_f$ 440 of the object 420. Also, the first component is in proportion to $g(z_f)$ and may have a small value when the object 420 is transparent and the degree of transparency t is close to "1", and may have a large value when the object 42 is opaque and the degree of transparency t is close to "0".

Also, a second component may represent strength of a signal reflected from the background 430. The second component is in inverse proportion to a square of $z_b$ of the object 420 and is in proportion to $L_b$ 450 of the background 430. Also, the second component is in proportion to $g(z_b)$ and may have a large value when the object 420 is transparent and the degree of transparency t is close to "1", and may have a small value when the object 420 is opaque and the degree of transparency is close to "0".

A third component may indicate a case in which a signal reflected from the background 430 is reflected again toward the object 420. A signal reflected from the object 420 may be reflected again toward the background 430, and a signal reflected from the background 430 may be reflected again toward the object 420. In Equation 3, i denotes the number of reflections from the background 430. The third component is in inverse proportion to background depth information $z_b$ and a difference between background depth information $z_b$ and foreground depth information $z_f$.

As described above, an estimating unit may estimate a foreground depth of the object 420, a background depth, and a degree of transparency t as predetermined values, and may estimate second depth information $\hat{z}$ based on the estimated values.

Here, when the background 430 is assumed to be even, background depth information $z_b$ may be assumed as the same value with respect to the entire depth image captured using the depth camera 410. Also, the degree of transparency of the object 420 may be assumed as the same value with respect to the entire depth image.

The estimating unit may assume that the object 420 is positioned on a predetermined straight line corresponding to the depth camera 410. In this example, a position of the object 420 may be limited to a position in a one-dimensional (1D) space, instead of being a position in a 3D space.

A comparing unit may compare the measured first depth information and the estimated second depth information. For example, the comparing unit may determine whether a difference between the measured first depth information and the estimated second depth information is within a predetermined range.

A determining unit may determine third depth information of the object 420 based on the comparison result. When the difference between the measured first depth information and the estimated second depth information is within the predetermined range, the determining unit may determine that third depth information of the object 420 is the estimated second depth information. Also, based on the assumption that the object 420 is positioned on a predetermined straight line corresponding to the depth camera 410, the determining unit may estimate a distance from the depth camera 410 using the third depth information, for example, actual depth information of the object.

On the contrary, when the difference between the measured first depth information and the estimated second depth information is outside the predetermined range, the determining unit may determine that the above estimation for estimating second depth information, for example, at least one of the foreground depth information $z_f$ of the object 420, the background depth information $z_b$, and the degree of transparency t of the object 420, is unreasonable. The estimating unit may re-estimate the second depth information by changing at least one of the estimated foreground depth, the background depth, and the degree of transparency. The comparing unit may then compare the first depth information and the re-estimated second depth information.

For example, when the measured first depth information and the estimated second depth information is identical, or when the difference between the measured first depth information and the estimated second depth information is within the predetermined range, the determining unit may determine that third depth information of the object 420, for example, actual depth information of the object 420 is the estimated foreground depth of the object 420 used to calculate the second depth information.

On the contrary, when the difference between the measured first depth information and the estimated second depth information is outside the predetermined range, the estimating unit may re-estimate the second depth image by changing one or more of the estimated foreground depth of the object 420, the background depth of the background 430, and the degree of transparency of the object 420. When the first depth information and the re-estimated second depth information is identical, or when the difference between the measured first depth information and the re-estimated second depth information is within the predetermined range, the determining unit may determine that third depth information of the object 420, for example, actual depth information of the object 420 is the changed foreground depth. When the difference between the measured first depth information and the re-estimated second depth information is still outside the predetermined range, the estimating unit may again re-estimate the second depth information by again changing the estimated foreground depth of the object 420, the background depth of the background 430, and the degree of transparency of the object 420.

Figure 5:
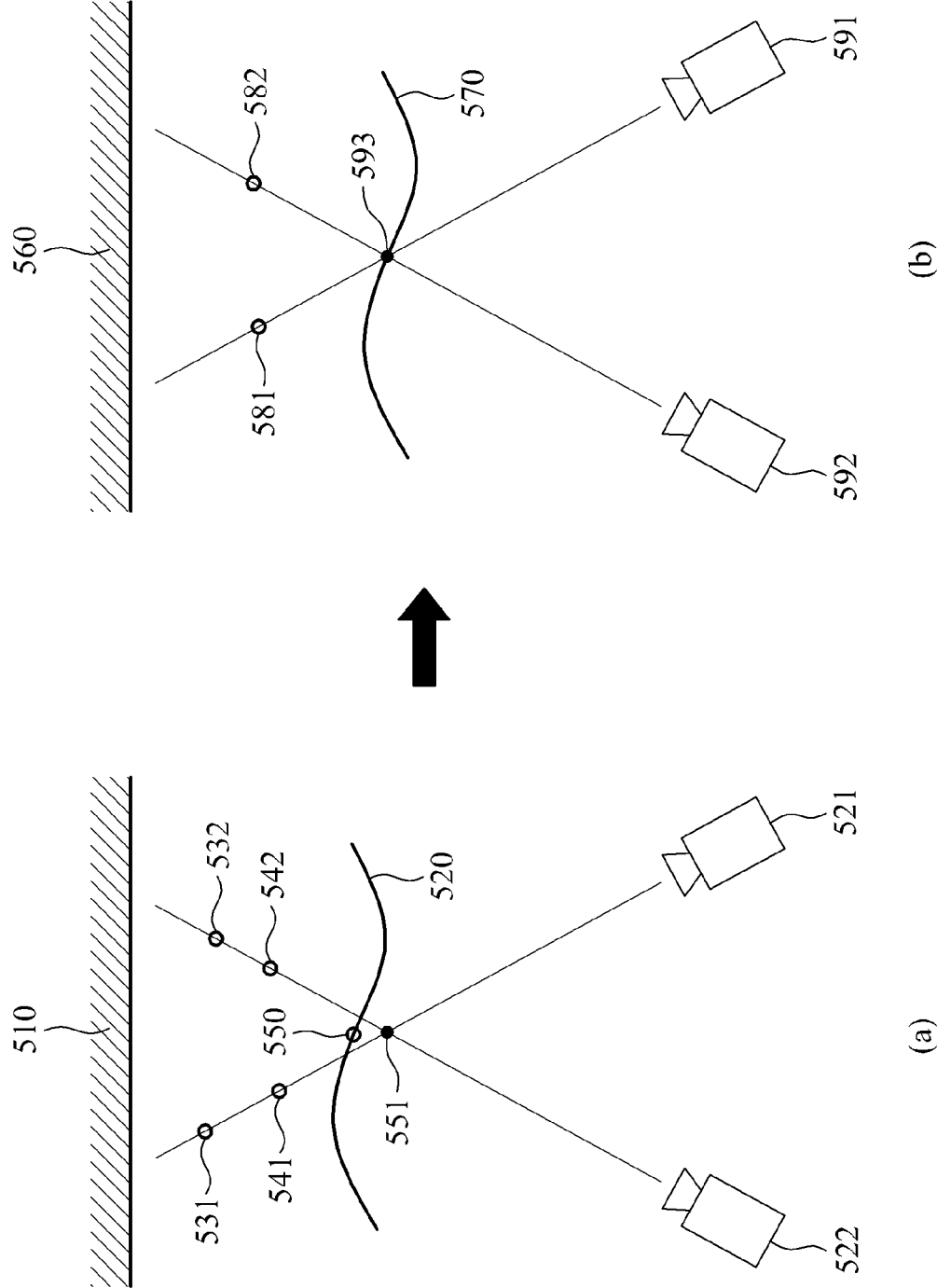
FIG. 5 illustrates a diagram to describe an operation of determining depth information of an object using a plurality of depth cameras according to an embodiment.

FIG. 5 illustrates a diagram to describe an operation of determining depth information of an object using a plurality of depth cameras according to an embodiment. A diagram (a) on the left side of FIG. 5 illustrates a case in which an estimated foreground depth of an object 520 is inaccurate, and a diagram (b) on the right side of FIG. 5 illustrates a case in which an estimated foreground depth of an object 570 is accurate.

In the diagram (a) of FIG. 5, a plurality of depth cameras 521 and 522 may receive a signal reflected from a background 510 and a signal reflected from the object 520.

A position of the object 520 may be estimated on straight lines corresponding to the plurality of depth cameras 521 and 522. Foreground depth information may be calculated based on an estimated position 551 of the object 520, and second depth information may be estimated based on the calculated foreground depth information. A foreground depth of the object 520 may be estimated based on the estimated position 551 of the object 520.

A surface 550 of the object 520 may be positioned at a position farther away from the estimated position 551. Accordingly, the estimated foreground depth may be inaccurate. Second depth information 541 and 542, estimated based on the estimated foreground depth, may be different from measured first depth information 531 and 532.

In the diagram (b) of FIG. 5, an estimated position 593 is accurately set on a surface of the object 570. In this example, second depth information estimated based on the estimated foreground depth may match measured first depth information 581 and 582.

As described above, according to an embodiment, in the case of capturing a depth image using a plurality of depth cameras and analyzing the depth image, it is possible to more accurately determine a position or depth information of an object by combining information obtained using the plurality of depth cameras.

Even though two depth cameras are employed in FIG. 5, a 3D information processing apparatus may alternatively determine depth information through predetermined modeling, using N depth cameras. Here, N denotes an integer greater than or equal to "1". When multiple depth cameras are used, a depth need not be measured by each camera multiple times in the time domain. That is, when multiple depth cameras are used, multiple depth information may be simultaneously obtained for a single object surface. More specifically, in an embodiment, a foreground, a background, and a transparency level of the object may be simultaneously estimated given a group of depth measurements, using a predetermined model for example.

Modeling may be a function that uses a value associated with the object 570 as an input and uses estimated second depth information of the object 570 as an output. For example, modeling may be a function that uses at least one of, for example, all of the estimated foreground depth information, background depth information, and degree of transparency as an input and uses the estimated second depth information of the object 570 as an output. The foreground depth information may be a value calculated using a first reflected signal that is reflected from the object 570 at the estimated foreground depth of the object. The background depth information may be a value calculated using a second reflected signal that is reflected from a background 560 at the estimated background depth. The degree of transparency may be an estimated degree of transparency of the object 570.

In this example, values about the foreground depth of the object 570, the background depth of the background 560, and the degree of transparency of the object 570 may be estimated, and second depth information may be estimated based on the estimated values. By comparing the estimated second depth information with depth information measured using a plurality of depth cameras 591 and 592, actual depth information of the object 570 may be obtained. Accordingly, when comparing depth information measured using at least three depth cameras and estimated second depth information, more accurate actual depth information of the object 570 may be generated.

According to an embodiment, the measuring unit 210 of FIG. 2 may include N depth cameras, and may generate N items of first depth information corresponding to the N depth cameras. Here, N denotes an integer greater than or equal to '1'. Each of the N depth cameras may receive a signal reflected from the object 260. The estimating unit 220 may estimate at least one of a foreground depth, a background depth, and a degree of transparency. The estimating unit 220 may estimate N items of second depth information corresponding to the N depth cameras based on the estimated foreground depth, background depth, and degree of transparency. The comparing unit 230 may compare the N items of first depth information and the N items of second depth information, respectively. The determining unit 240 may determine third depth information of the object 260 based on the comparison result. When measuring depth information using at least three depth cameras, more accurate actual depth information of the object 260 may be generated.

FIG. 6 illustrates an example of a 3D information processing apparatus 600 including a plurality of depth cameras.

Referring to FIG. 6, the 3D information processing apparatus 600 may include a plurality of depth cameras 610, 620, and 630. Using the plurality of depth cameras 610, 620, and 630, the 3D information processing apparatus 600 may capture a depth image about an object and may more accurately and quickly determine depth information of the object by analyzing the captured depth images.

Each of the plurality of depth cameras 610, 620, and 630 may measure depth information of the object. A processor (not shown) of the 3D information processing apparatus 600 may estimate depth information of the object by estimating a foreground depth of the object, a background estimate of a background, and a degree of transparency of the object. The processor of the 3D information processing apparatus 600 may determine depth information of the object by comparing the estimated depth information and the measured depth information. According to an embodiment, even though the object transmits the light, it is possible to relatively accurately generate depth information of the object.

The 3D information processing apparatus 600 may be configured as a part of various electronic products, such as a digital camera, a mobile phone, and a portable electronic device, for example.

Even though three depth cameras are employed in FIG. 6, at least four depth cameras may be employed to be included in the 3D information processing apparatus 600. The depth cameras may be provided to the 3D information processing apparatus 600 at positions different from FIG. 6.

FIG. 7 illustrates a method of processing 3D information according to an embodiment.

In operation 710, a 3D information processing apparatus may measure first depth information of an object. The 3D information processing apparatus may measure first depth information using a conventional TOF scheme implemented with a depth camera.

The 3D information processing apparatus may transmit a pulse toward the object and may measure first depth information of the object using a signal that is reflected from the object by the transmitted pulse. The pulse transmitted from the 3D information processing apparatus may be an IR ray. When the object has a light transmitting property, the 3D information processing apparatus may measure first depth information of the object using a signal that passes through the object and is reflected from a background when the background is irradiated by the IR ray.

In operation 720, the 3D information processing apparatus may estimate a position of the object, and may estimate second depth information of the object based on the estimated position, foreground depth information, and background depth information. That is in an embodiment, the 3D information processing apparatus may estimate a position of the object by estimating an approximate space where the object is located such as a center position of the object.

For example, the foreground depth information of the object may be estimated using a first reflected signal that is reflected from the object at the estimated position of the object. The background depth information may be calculated using a second reflected signal that passes through the object and is reflected from the background. The 3D information processing apparatus may estimate second depth information according to Equation 2 or Equation 3.

The 3D information processing apparatus may estimate a degree of transparency of the object, and may estimate second depth information of the object based on the estimated degree of transparency, the estimated foreground depth information of the object, and the background depth information. Here, the estimated degree of transparency may be a value associated with the object, and may be a value greater than or equal to "0" and less than or equal to "1".

In operation 730, the 3D information processing apparatus may compare the conventionally measured first depth information of the object and the estimated second depth information of the object. The 3D information processing apparatus may determine whether a difference between the first depth information of the object and the second depth information of the object is less than a predetermined threshold.

When the difference between the first depth information of the object and second depth information of the object is greater than or equal to the predetermined threshold, the 3D information processing apparatus may determine that the difference between the first depth information of the object and the second depth information of the object is outside a predetermined range. In this case, the 3D information processing apparatus may re-estimate a position of the object as another value in operation 720 and may re-estimate second depth information of the object based on the re-estimated position of the object. If, in the second iteration, the difference between the first depth information of the object and the second depth information of the object is greater than or equal to the predetermined threshold, the 3D information processing apparatus may again re-estimate the position of the object as still another value and subsequent iterative calculations with different position values may then be performed until the difference between first depth information and second depth information is less than the predetermined threshold. In another embodiment, the 3D information processing apparatus may re-estimate the position of the object until the difference between first depth information and second depth information is minimized.

Otherwise, when the difference between the first depth information of the object and the second depth information of the object is less than the predetermined threshold, the 3D information processing apparatus may determine that an actual depth information of the object is the estimated foreground depth of the object. Alternatively, the 3D information processing apparatus may determine that the actual depth information of the object is the estimated second depth information of the object.

According to another embodiment, in operation 720, the 3D information processing apparatus may estimate a degree of transparency of the object, and may estimate second depth information of the object based on the estimated degree of transparency.

In this case, when the difference between the first depth information of the object and the second depth information of the object is greater than or equal to the predetermined threshold, the 3D information processing apparatus may re-estimate the degree of transparency as another value in operation 720 and may estimate second depth information of the object based on the re-estimated degree of transparency. For example, a transparency value of 0.2 may be used in a second iteration when the transparency value of 0.1 used in the first iteration results in the difference between the first depth information of the object and the second depth information of the object being greater than or equal to the predetermined threshold. If, in the second iteration, the difference between the first depth information of the object and the second depth information of the object is greater than or equal to the predetermined threshold, the 3D information processing apparatus may re-estimate the degree of transparency as still another value, e.g., as 0.3, and subsequent iterative calculations with different degrees of transparency may then be performed until the difference between first depth information and second depth information is less than the predetermined threshold.

Otherwise, when the difference between first depth information of the object and second depth information of the object is less than the predetermined threshold, the 3D information processing apparatus may determine that the estimated degree of transparency of the object is an actual degree of transparency of the object in operation 740. The 3D information processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a controller such as a dedicated processor unique to that unit or by a processor common to one or more of the modules. The described methods may be executed on a general purpose computer or processor or may be executed on a particular machine such as the apparatuses described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for processing three-dimensional (3D) information, the apparatus comprising:
   a processor configured to control one or more processor-executable units;

a measuring unit configured to measure first depth information of an object;
an estimating unit configured to estimate second depth information of the object;
a comparing unit configured to compare the measured first depth information and the estimated second depth information; and
a determining unit configured to determine third depth information of the object based on the comparison result.

2. The apparatus of claim 1, wherein the estimating unit is configured to estimate a foreground depth of the object, a background depth of a background, and a degree of transparency of the object, and is configured to estimate the second depth information through predetermined modeling based on the estimated foreground depth, the background depth, and the degree of transparency.

3. The apparatus of claim 2, wherein the estimating unit is configured to estimate the second depth information based on foreground depth information calculated using a first reflected signal that is reflected from the object at the estimated foreground depth, background depth information calculated using a second reflected signal that passes through the object and is reflected from the background at the estimated background depth, and the estimated degree of transparency of the object.

4. The apparatus of claim 2, wherein the estimating unit is configured to estimate the second depth information based on at least one of foreground depth information calculated using a first reflected signal that is reflected from the object at the estimated foreground depth, an intensity of the object, background depth information calculated using a second reflected signal that passes through the object and is reflected from the background at the estimated background depth, intensity of the background, and the estimated degree of transparency of the object.

5. The apparatus of claim 2, wherein the modeling estimates the second depth information according to the following equation:

$$\hat{z} = g^{-1}\left( \frac{(1-t)\cdot L_f \cdot g(z_f)}{z_f^2} + \frac{t \cdot L_b \cdot g(z_b)}{z_b^2} + \sum_{i=0}^{\infty} \frac{i+1 \cdot (1-t)^i \cdot L_b \cdot g(z_b) \cdot g(z_b - z_f)}{z_b^{i+1} \cdot (z_b - z_f)^i} \right)$$

where $\hat{z}$ denotes the estimated second depth information, g(x) denotes a function that is determined based on a characteristic of a depth camera for measuring the first depth information, x denotes strength of a received signal, t denotes the estimated degree of transparency of the object, $L_b$ denotes intensity of the background at the estimated background depth, $L_f$ denotes intensity of the object, $z_f$ denotes foreground depth information calculated using a first reflected signal that is reflected from the object at the estimated foreground depth, and $z_b$ denotes background depth information that is calculated using a second reflected signal that passes through the object and is reflected from the background at the estimated background depth.

6. The apparatus of claim 1, wherein when a difference between the measured first depth information and the estimated second depth information is within a predetermined range, the determining unit is configured to determine that the third depth information of the object is the estimated second depth information.

7. The apparatus of claim 2, wherein when a difference between the measured first depth information and the estimated second depth information is outside a predetermined range, the estimating unit is configured to re-estimate the second depth information by changing the estimated foreground depth and background depth, and the comparing unit is configured to compare the first depth information and the re-estimated second depth information.

8. The apparatus of claim 2, wherein:
the measuring unit comprises N depth cameras configured to receive a signal reflected from the object, and is configured to generate N items of first depth information corresponding to the N depth cameras, N being an integer greater than or equal to "1",
the estimating unit is configured to estimate N items of second depth information corresponding to the N depth cameras based on the estimated foreground depth, the background depth, and the degree of transparency, and
the comparing unit is configured to compare the N items of first depth information and the N items of second depth information, respectively.

9. The apparatus of claim 1, wherein the measuring unit comprises:
a transmitting unit configured to transmit an infrared (IR) ray toward the object, and
wherein the measuring unit is configured to measure the first depth information of the object using a signal that is reflected from the object and a signal that passes through the object and is reflected from a background when the background is irradiated by the IR ray.

10. The apparatus of claim 1, wherein the estimating unit is configured to estimate a position of the object and a degree of transparency of the object, and is configured to estimate the second depth information of the object based on the estimated position of the object and the degree of transparency; and
wherein the determining unit is configured to determine the degree of transparency of the object based on the comparison result.

11. A method of processing three-dimensional (3D) information, the method comprising:
measuring first depth information of an object using a depth camera;
estimating, by way of a processor, second depth information of the object; and
determining third depth information of the object by comparing the measured first depth information and the second depth information.

12. The method of claim 11, wherein a foreground depth of the object, a background depth of a background, and a degree of transparency of the object are estimated, and the second depth information is estimated through predetermined modeling based on the estimated foreground depth, the background depth, and the degree of transparency.

13. The method of claim 12, wherein the second depth information is estimated based on foreground depth information calculated using a first reflected signal that is reflected from the object at the estimated foreground depth, background depth information calculated using a second reflected signal that passes through the object and is reflected from the background at the estimated background depth, and the estimated degree of transparency of the object.

14. The method of claim 12, wherein the second depth information is estimated based on at least one of foreground depth information calculated using a first reflected signal that is reflected from the object at the estimated foreground depth, an intensity of the object, background depth information calculated using a second reflected signal that passes through the object and is reflected from the background at the estimated background depth, intensity of the background, and the estimated degree of transparency of the object.

15. The method of claim 12, wherein the modeling estimates the second depth information according to the following equation:

$$\hat{z} = g^{-1}\left( \frac{(1-t) \cdot L_f \cdot g(z_f)}{z_f^2} + \frac{t \cdot L_b \cdot g(z_b)}{z_b^2} + \sum_{i=0}^{\infty} \frac{t^{i+1} \cdot (1-t)^i \cdot L_b \cdot g(z_b) \cdot g(z_b - z_f)}{z_b^{i+1} \cdot (z_b - z_f)^i} \right)$$

where $\hat{z}$ denotes the estimated second depth information, g(x) denotes a function that is determined based on a characteristic of a depth camera for measuring the first depth information, x denotes strength of a received signal, t denotes the estimated degree of transparency of the object, $L_b$ denotes intensity of the background at the estimated background depth, $L_f$ denotes intensity of the object, $z_f$ denotes foreground depth information calculated using a first reflected signal that is reflected from the object at the estimated foreground depth, and $z_b$ denotes background depth information that is calculated using a second reflected signal that passes through the object and is reflected from the background at the estimated background depth.

16. The method of claim 11, wherein a position of the object is estimated and the second depth information is estimated through predetermined modeling based on the estimated position.

17. The method of claim 12, wherein the determining comprises determining that the third depth information of the object is the estimated second depth information when a difference between the measured first depth information and the estimated second depth information is within a predetermined range.

18. The method of claim 11, wherein the estimating comprises estimating, by way of the processor, a position of the object and a degree of transparency of the object, and estimating the second depth information of the object based on the estimated position of the object and a degree of transparency; and wherein the determining comprises determining a degree of transparency of the object by comparing the measured first depth information and the second depth information.

19. The method of claim 11, wherein the estimating further comprises:

capturing a depth value of the object using a plurality of different depth cameras;

comparing, by way of the processor, the depth values of the object captured using the plurality of different depth cameras; and determining the object to have at least some level of transparency when the compared depth values of the object are different.

20. A non-transitory computer-readable medium comprising a program for instructing a computer to perform the method of claim 11.

* * * * *